US009160898B2

(12) United States Patent
Hammond et al.

(10) Patent No.: US 9,160,898 B2
(45) Date of Patent: Oct. 13, 2015

(54) SYSTEM AND METHOD FOR IMPROVED VIDEO MOTION CONTROL

(75) Inventors: Asa Hammond, Richmond, CA (US); Jeff Linnell, Woodside, CA (US); Kendra Byrne, San Francisco, CA (US)

(73) Assignee: Autofuss, San Francisco, CA (US)

( * ) Notice: Subject to any disclaimer, the term of this patent is extended or adjusted under 35 U.S.C. 154(b) by 811 days.

(21) Appl. No.: 13/358,454

(22) Filed: Jan. 25, 2012

(65) Prior Publication Data

US 2012/0188350 A1 Jul. 26, 2012

Related U.S. Application Data

(60) Provisional application No. 61/436,118, filed on Jan. 25, 2011.

(51) Int. Cl.
*H04N 7/18* (2006.01)
*H04N 5/222* (2006.01)
*H04N 5/232* (2006.01)

(52) U.S. Cl.
CPC ............ *H04N 5/222* (2013.01); *H04N 5/23203* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,255,096 A | * | 10/1993 | Boyle | 348/95 |
| 5,403,140 A | * | 4/1995 | Carmichael et al. | 414/280 |
| 5,581,276 A | | 12/1996 | Cipolla et al. | |
| 5,737,500 A | * | 4/1998 | Seraji et al. | 700/251 |
| 7,903,927 B2 | * | 3/2011 | Minami et al. | 386/278 |
| 7,996,771 B2 | * | 8/2011 | Girgensohn et al. | 715/723 |
| 2003/0085891 A1 | | 5/2003 | Lyons et al. | |
| 2007/0171380 A1 | | 7/2007 | Wright et al. | |
| 2007/0273845 A1 | * | 11/2007 | Birmingham | 353/101 |
| 2007/0291185 A1 | | 12/2007 | Gelb et al. | |
| 2008/0011904 A1 | * | 1/2008 | Cepollina et al. | 244/172.6 |
| 2008/0018732 A1 | | 1/2008 | Moller | |
| 2008/0137756 A1 | * | 6/2008 | Scherlis et al. | 375/240.28 |

(Continued)

FOREIGN PATENT DOCUMENTS

KR 10 2011 0061548 A 6/2011

OTHER PUBLICATIONS

PCT International Search Report and Written Opinion, PCT International Application No. PCT/US2012/065116, dated Feb. 27, 2013, 11 pages.

*Primary Examiner* — Dave Czekaj
*Assistant Examiner* — Tyler W Sullivan
(74) *Attorney, Agent, or Firm* — McDonnell Boehnen Hulbert & Berghoff LLP

(57) ABSTRACT

Systems and methods for creating a motion control photography set are disclosed. One embodiment includes a master control that receives control signals for a plurality of device actors, such as robot arms, lighting, and camera controls, and synchronizes the plurality of control signals with a global timeline to create a plurality of synchronized signals, such that the control data for each actor of the device actors is associated with a corresponding position in the global timeline. According to another embodiment, the set also includes a master input that conveys a master input signal to the master control indicating a position in the global timeline and a rate of progression through the global timeline. In response to the master input signal, the control data for each actor of the device actors is sent to respective device actors at an adjustable rate of progression through the global timeline.

20 Claims, 14 Drawing Sheets

(56) References Cited

U.S. PATENT DOCUMENTS

| | | |
|---|---|---|
| 2008/0235970 A1* | 10/2008 | Crampton .................. 33/503 |
| 2009/0213213 A1 | 8/2009 | Fright et al. |
| 2009/0284714 A1 | 11/2009 | Kugo et al. |
| 2009/0310088 A1 | 12/2009 | Jung et al. |
| 2010/0018339 A1 | 1/2010 | Aiken |
| 2010/0074532 A1 | 3/2010 | Gordon et al. |
| 2010/0090948 A1 | 4/2010 | Oba et al. |
| 2010/0165188 A1* | 7/2010 | Jannard .................. 348/375 |
| 2010/0217528 A1 | 8/2010 | Sato et al. |
| 2010/0227527 A1* | 9/2010 | Smoot et al. .................. 446/362 |
| 2011/0134225 A1 | 6/2011 | Saint-Pierre et al. |
| 2011/0172822 A1* | 7/2011 | Ziegler et al. .................. 700/259 |
| 2013/0120547 A1* | 5/2013 | Linnell .................. 348/61 |
| 2013/0218340 A1* | 8/2013 | Hager et al. .................. 700/257 |

* cited by examiner

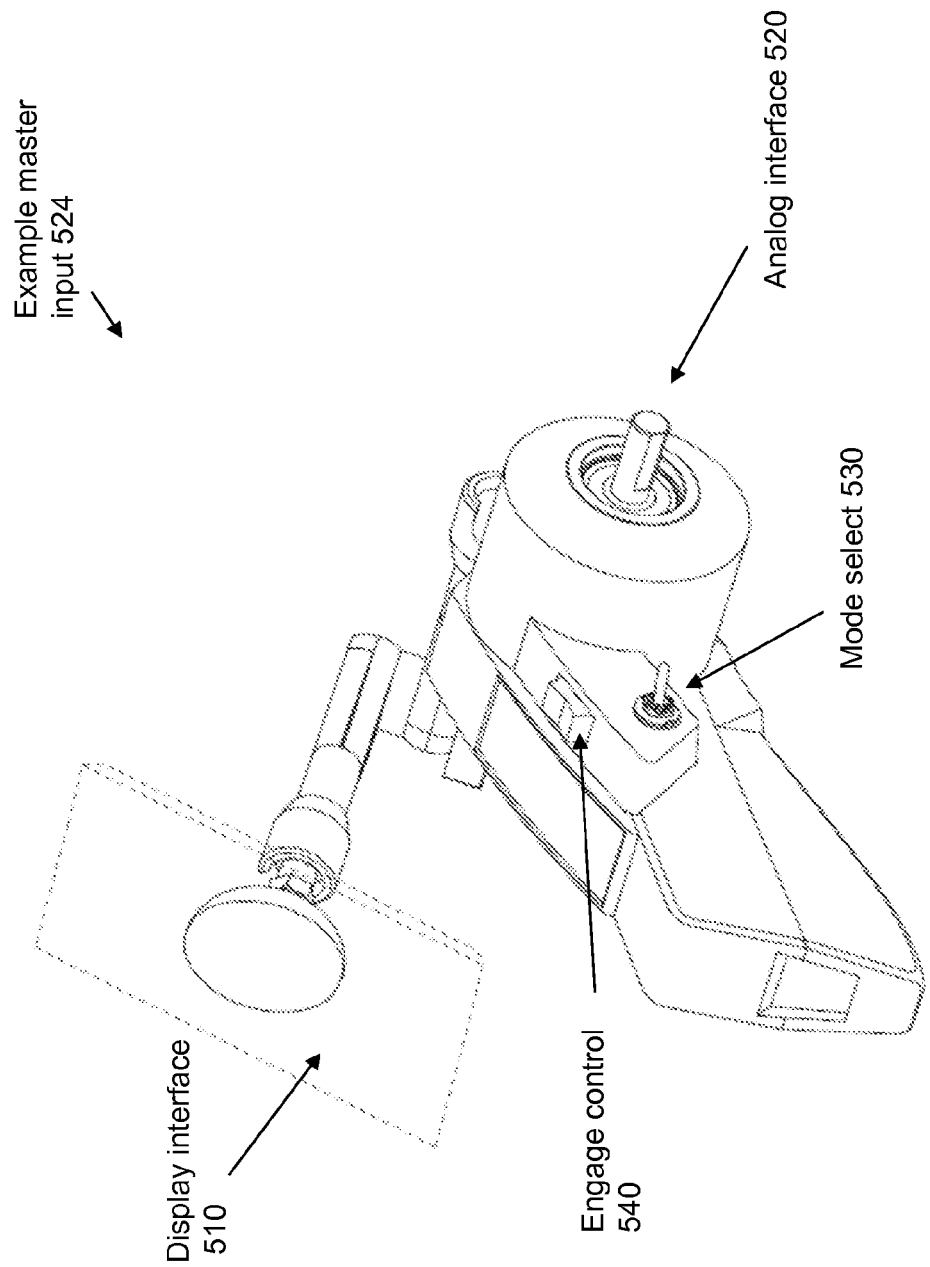

SYSTEM AND METHOD FOR IMPROVED VIDEO MOTION CONTROL

BACKGROUND

Embodiments of the present invention relate to the use of automated systems and controls in the creation of audiovisual film scenes. More specifically, embodiments of the invention relate to systems and methods of using a master control with motion control to create a film scene.

Motion control is a type of automation, where the position of an object or objects is controlled using some type of device such as a robotic arm. In the production of videos, films, commercials, movies, and other such audiovisual works, the placement and movement of the camera and objects in a scene being captured by the camera may be a major consideration and source of time and expense. The use of motion control is known in the film industry, where a camera may be mounted and controlled as part of the creation and recording of a video scene. This technique is commonly referred to as motion control photography.

In certain scenes, it may be necessary to create multiple takes of the same scene. This may be necessary due to mistakes, a desire to alter elements of the scene, or to enable special effects. The need for precise control and repetition of camera movements is especially true where overlays or special effects are using elements from multiple takes in the same scene. Similarly, when a scene may be shot from multiple angles using, for example, a model of a plane or some other player appearing in the film, precise motion control may allow multiple scenes to more accurately be presented as representing a single event. Precise control may allow a set with moving objects and cameras to be filmed repeatedly with minor changes between takes. Desired minor changes may include removing people or objects. In the most basic form, this may enable a special effect of making someone disappear. The ability to have objects moving in a nearly identical fashion as the disappearance happens, through the use of multiple takes, may make the scene more seamless, believable, or preferable to a scene where a jump in background objects occur at the moment of disappearance. Precise motion control can enable images created in a computer to be more seamlessly added to a real world video scene in conjunction with multiple takes. Correcting a mismatch between movements in different takes may be extremely expensive or impossible. Motion control may enable accurate control and matching of scenes for these purposes, thus reducing cost and enabling improved effects. Motion control in the film industry, however, can be very expensive, and is typically created in an environment where custom modifications and arrangements are used in most instances to match custom scenes and locations.

SUMMARY

Multiple various embodiments and implementations are possible in accordance with the present invention. As such, it will be understood that these implementations may include different combinations and structures that are shown as illustrative examples, and that additional alternative embodiments not specifically detailed herein will be apparent to a person of ordinary skill in the art.

One potential embodiment includes a system for motion control photography comprising a master control that receives a plurality of control signals comprising control data for a plurality of device actors and synchronizes the plurality of control signals with a global timeline to create a plurality of synchronized signals, such that control data for each actor of the device actors is associated with a corresponding position in the global timeline; and a master input that conveys a master input signal to the master control indicating a position in the global timeline and a rate of progression through the global timeline. The master control responds to the master input signal by communicating the plurality of synchronized signals associated with the position in the global timeline to the plurality of device actors, and the control data for each actor of the device actors is sent to respective device actors at the rate of progression through the global timeline.

Alternative embodiments may further include systems where the master input comprises an analog input, a mode selector, and an analog input action control; systems where the analog input action control returns the analog input to a first position when no force is applied to the analog input; systems where for a first selected mode of the master input, adjustment of the analog input in a first direction increases the rate of progress through the global timeline from a predetermined standard forward rate; systems where for the first selected mode of the master input, adjustment of the analog input in a second direction different from the first direction decreases the rate of progress through the global timeline from the predetermined standard forward rate; systems where for a second selected mode of the master input, adjustments to the analog input in the first direction creates a variable rate of progress in the forward direction from a stationary rate; and systems where for the second selected mode of the master input, adjustments to the analog input in the second direction creates a variable rate of progress in a reverse direction from the stationary rate.

Additional embodiments may further include systems where the analog input is a wheel, systems that include an object detector that observes an area proximate to a first device actor of the plurality of device actors and transmits a safety shutdown signal to the first device actor when the object detector senses an object, and systems with a master safety control. A master safety control may comprise a programmable logic circuit where a safety shutdown signal is transmitted to each of the plurality of device actors via the programmable logic circuit.

Additional embodiments may further include systems where the first device actor is a robotic arm, the object detector is attached to a mounting point of the robotic arm, and wherein the area proximate to the first device actor comprises an area extending a fixed distance from the object detector. In further such alternative systems, the area proximate to the first device actor varies over time in a predetermined manner determined in association with the position in the global timeline and the rate of progress through the global timeline, and in still further systems, the object detector comprises a light detection and ranging unit.

Additional embodiments may further include systems that have a first control for creating a first control signal comprising control data for only one of the plurality of device actors, systems that have a first control for creating a first control signal comprising control data for each of the plurality of device actors, or systems where the plurality of device actors comprises a camera robot, a lighting robot; a follow focus; and a digital output bank.

One alternative potential embodiment includes a method of creating a film using motion control. Such a method may include receiving control data for a plurality of device actors at a master control comprising a processor and a memory; synchronizing plurality of control signals, using the master control, with a global timeline to create a plurality of synchronized signals, such that the control data for each actor of the device actors is associated with a corresponding position in the global timeline; receiving, at the master control, a master input signal indicating a position in the global timeline and a rate of progression through the global timeline; and communicating, in response to the master input signal, the plurality of synchronized signals associated with the position in the global timeline from the master control to the plurality of device actors, wherein the plurality of synchronized signals are sent to the plurality of device actors at the rate of progression through the global timeline indicated by the master input signal.

Alternative methods may further include detecting, using at least one object detector, an area proximate to the plurality of device actors; and transmitting, from the at least one object detector, a safety shutdown signal that prevents the plurality of device actors from operating. Other methods may further operate such that the rate of progress through the global timeline comprises a reverse rate of progress through the global timeline.

Alternative methods may further include receiving at the master control, during the communicating of the plurality of synchronized signals, a modifying control input for a first device actor of the plurality of device actors from an independent manual control; synchronizing the modifying control input with the plurality of synchronized signals to create an updated plurality of synchronized signals during the communication of the plurality of synchronized signals; and communicating the updated plurality of synchronized signals in place of the synchronized signals. These methods may additional include storing the updated plurality of synchronized signals in a database, wherein the control data is received at the master control from the database.

Alternative methods may further include receiving at the master control, feedback data from the plurality of device actors describing an operating characteristic associated with the synchronized control signals; and modifying the synchronized control signals in response to the feedback data. Other alternatives may include the plurality of device actors made up of a first robot and a secondary control, wherein the secondary control comprises a processing device coupled by a network to a second robot.

One further alternative potential embodiment includes a computer program product comprising a computer readable medium storing instructions for execution by a computing system for implementing a method of creating a film using motion control, the method comprising: modeling physical characteristics and locations, using a software control comprising a computing device; for a plurality of device actors in a motion control set; modeling movement characteristics, using the software control, for the plurality of device actors in the motion control set to create control data for the plurality of device actors; analyzing the modeling of the movements, physical characteristics, and locations of the plurality of device actors, using the software control, to detect collisions and to detect device actor motion that exceeds a set of predetermined operating limits; and communicating the control data to a master control that synchronizes the control data and transmits the control data to the plurality of device actors.

Alternatives to such an embodiment may further include products where the method further comprises analyzing the modeling of the movements, physical characteristics, and locations of the plurality of device actors, using the software control, to determine a set of locations proximate to the device actors that include a collision risk; transmitting the set of locations to a master safety control comprising at least one object detector.

BRIEF DESCRIPTION OF THE DRAWINGS

FIG. 5a shows one potential embodiment of a master input for use with a motion control system according to one embodiment of the innovations herein.

DETAILED DESCRIPTION

Figure 1:
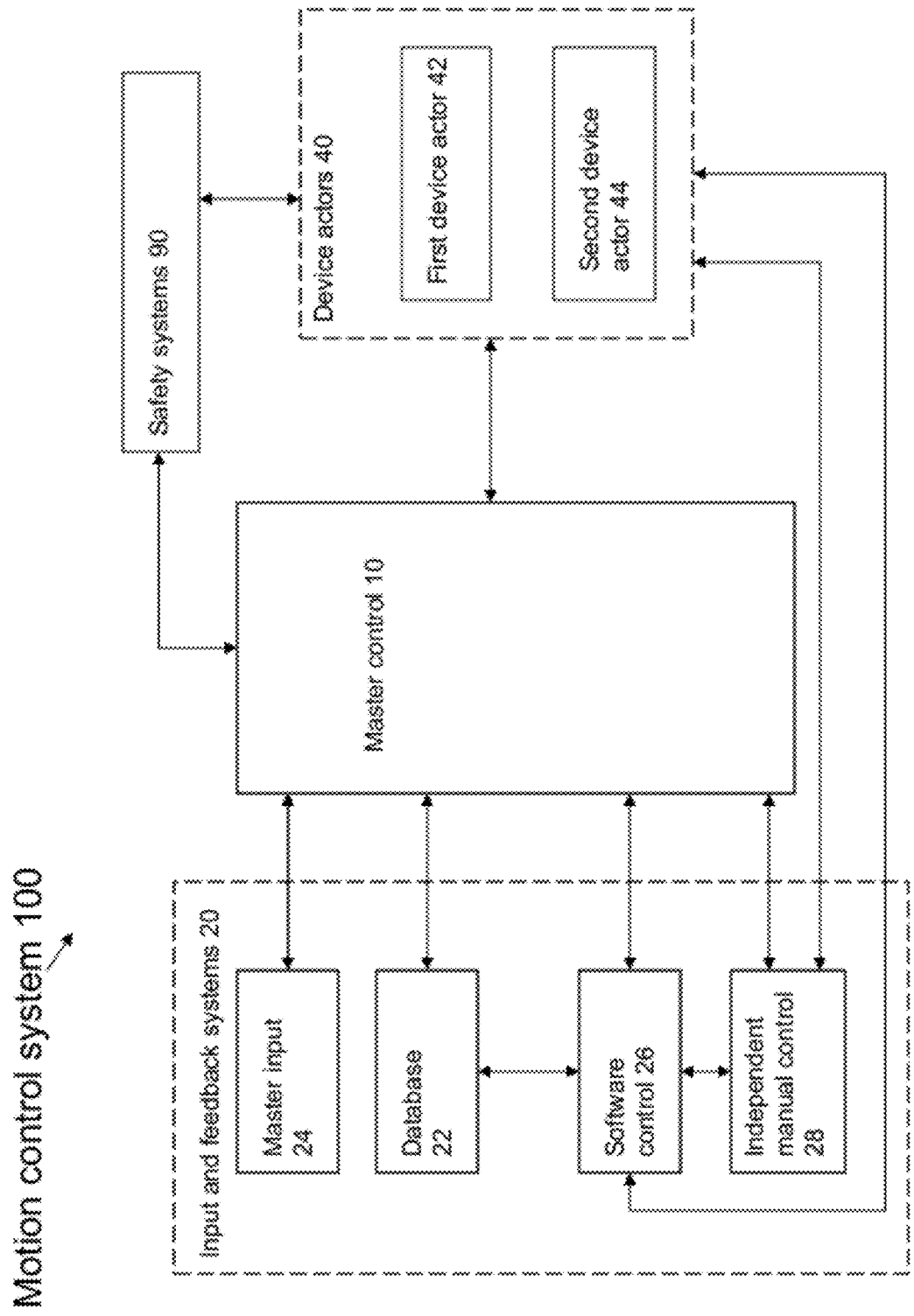
FIG. 1 shows a block diagram of a motion control photography system including a master scene control according to one embodiment of the innovations herein.

Embodiments of the innovations disclosed herein include systems and methods for providing enhanced motion control. More specifically, an adaptable and programmable system integrates multiple components into a master system to provide improved methods of scene and set control.

Although embodiments will be illustrated with reference to specific implementations, a person of ordinary skill in the art will understand that these implementations describe innovations which may have broad use other than the specifically described implementations. As described below, enhanced control may comprise systems and methods for a variety of functions, including safety systems, playback speed control, forward and reverse position scrubbing, and integrated detection systems, among others.

Such a system includes advantages over systems currently known in the art by providing accessible and highly sophisticated robotic controls in an art environment dominated by custom toolsets without simple or malleable integration toolsets. Such a use of highly accurate control systems with cameras may be considered, in certain embodiments, to be "cinematic automation" which allows the ambitions of visual story tellers to be matched through the application of automation systems. For example, improved control systems can coordinate sub-millimeter position of a camera in space with the position of the light, the actress, and special effects (pyrotechnics, video playback, sound cues, etc.). This allows execution of highly complex shots that would previously have required the coordination of several film departments with manual human positioning. Such control systems have taken the human inaccuracies out, and introduced the repeatability of robotics, through highly accurate computer synchronization of events. In addition to developing a faster, more rigid, safer, and easier to program robotic arm system, embodiments of the present innovations include interfaces that allow a creative director to make very quick on-set adjustments. In the high pressure environment of feature films, and commercial productions, it is critical that a director or visual effects supervisor is able to make very quick creative or technical calls, and the systems described herein enable this in a way not known in the previous art.

As a further example, if a system implementation of the innovations is being used in shooting a zero gravity space scene starring a very very expensive movie star named, for example, "George", the system might be synchronizing a large robotic camera arm, a custom robotic rig to move George, video playback of a wall of LED's that serve as the light source, and the motion of a piece of space debris that floats by the actor. This is a highly technical, pre-programmed shot that has been pre-visualized in a computer, and the interplay of all the elements have been choreographed down to milliseconds using the system. After the first take, George requests conference with the director. He is convinced that his character would gaze into the camera a little longer before being clobbered by a piece of space junk. Naturally, the director thinks this idea is brilliant and orders the crew to sort out the change. As you might imagine, this involves many aspects and the coordination of multiple departments. The system in use, however, has anticipated this sort of request, and has an interface used to adjust onset time. During the next take, the director may simply turn a knob at the right moment to accommodate the actor's dramatic pause. The robot slows down, the actor's robotic rig complies, the video decelerates as does the debris. All of this happens in synchronicity, and the day is saved . . . oh, and it's repeatable, just in case George doesn't live up to his part. Plus the system can provide enhanced safety to prevent George from being injured.

FIG. 1 describes a motion control system 100. Motion control system 100 is part of a motion controlled set used to film a scene using motion control photography. Motion control system comprises a master control 10, input and feedback systems 20, device actors 40 including a first device actor 42 and a second device actor 44, and safety systems 90. From the most basic perspective, motion control system 100 functions when an input system 20 provides instructions to a device actor 40 via master control 10.

For the purposes of the present invention, a scene comprises a set of motions and actions by device actors 40 over a continuous period of time, such that a set of players in front of a camera may be recorded in video, sound, or both. The players may be people, stationary objects, or objects controlled or moved by one or more devices of device actors 40. In one embodiment, the camera is mounted to a robot arm of device actors 40. At a beginning of a scene, a camera and a plurality of players begin in a first position. Motion control of device actors 40 moves the camera and the players through a sequence of motions to the end of a scene, with players and sound from the scene recorded using the camera and potentially other audio and video recording equipment to capture the motion.

In one potential embodiment as part of a motion control system 100, input and feedback systems 20 may include a database 22, a master input 24, a software control 26, and an independent manual control 28. As part of the input and feedback systems 20, database 22 may operate to provide a set of timing and position data to direct all or a portion of device actors 40. Alternatively, database 22 may store data being created by manual or individual movement or data input related to operation and function of device actors 40. Database 22 may also store data created independently of device actors 40, such as data created using software modeling features of a software control 26.

A master input 24 may be any device that functions to operate all of the device actors 40 associated with a particular scene being created with motion control system 100. Master input 24 functions by sending input control signals to master control 10. Master control 10 then adapts the signal from master input 24 to send individual control signals to a plurality of actors operating as device actors 40 for the particular scene. In one potential embodiment, every individual device of device actors 40 is provided a control signal from master control 10 when a signal is received from master input 24, including a signal to maintain a status quo or non-action to devices that are not operating as device actors 40 for a particular scene. In an alternative embodiment, a portion of the device actors connected as part of motion control system 100 are not sent any signal from master control 10 as part of the operation of motion control system 100 for a particular scene.

Software control 26 may act as a replacement for master input 24 in sending control signals to the plurality of actors via the master control 10. Alternately, software control 26 may control individual devices from among device actors 40 to alternate, change, or experiment with motions of the individual device. In other potential embodiments, software control 26 may function to model the behavior of individual devices of device actors 40 within a virtual environment. In such an embodiment, software control 26 contains a software model for an individual device, which allows control signals to be created for the device without actually sending the control signals to the device. The control signals may then be stored in the software control 26, in database 22, within a computer memory component that may be part of master control 10, or within computer memory that may be part of the device of device actors 40 for which the controls are being created. After the control signal is created by software control 26 and propagated to the appropriate storage location, a master control signal from software control 26 or from master input 24 may activate the control signal for the individual device to act in conjunction with other device actors 40.

Any device of device actors 40 may additionally have a independent manual control 28. As described above with respect to software control 26, control signals for an individual device may be created in software modeling. Similarly, a device may have independent manual control 28 that may be used to operate a device of device actors 40. For example, in one potential embodiment, a device that is one of device actors 40 may be a follow focus that controls the focus of a camera. The follow focus may have a control device that is designed to control the focus of the camera that may operate as an independent manual control. When a set of instructions is being created for the entire scene, the independent manual control 28 may be given input commands over time that are recorded to database 22 or a memory device of master control 10. During creation of a set of instructions using independent manual control 28, the independent manual control 28 may communicate directly with the associated device of device actors 40. Alternatively, the independent manual control 28 may send the control signal to master control 10, which then conveys the signal to the associated device of device actors 40. The control signal may then be created either from the signal of the independent manual control 28, of from a measured feedback reading created by the operation of the associated device. Additionally, although in many situations it is preferable to have the independent manual control 28 actually control the associated device during control signal creation in order to view the results, control signals may be created without controlling the device. For example, if expected input signals are expected for certain time marks, an independent manual control 28 may be operated independent of the related device, and the control operation recorded. These function as ways in which instructions for individual device actors of device actors 40 may be integrated into a motion controlled scene as part of motion control system 100.

The result of the integration described above may be considered as a global timeline for a motion controlled scene. FIG. 5b, described in more detail below, provides an illustrated example, where the actions of multiple motion controlled actors are integrated into a global timeline using a master control. In FIG. 5b, various actors such as camera and lighting robots move at certain points during a scene. The actors may be receiving control signals during the entire scene from time a to time f, or may only receive controls when they actually move or act. Certain other actors, such as $1^{st}$ and $2^{nd}$ special effects (fx) actors may only receive single commands to act at one specific time, such as $1^{st}$ fx actor acting at time b in the global timeline of FIG. 5b. Such an integration into a global timeline may allow simplified user control of complex actions impacting an entire scene that may save significant amounts of time in modifying a particular scene with a given timeline. This allows scrubbing through time forward and backwards as well as seeking to a specific frame number or timecode for all actors in a particular scene, and slowing down or speeding up the performance of the entire set (system) in real time via hardware device Referring now to FIGS. 2-4, several non-limiting examples of device actors will be described. Although these Figures focus on the use of robotic arms, device actors may be other types of devices that may be stationary, such as sensors, stationary lights, and signal sources, as will be described later.

Figure 2:
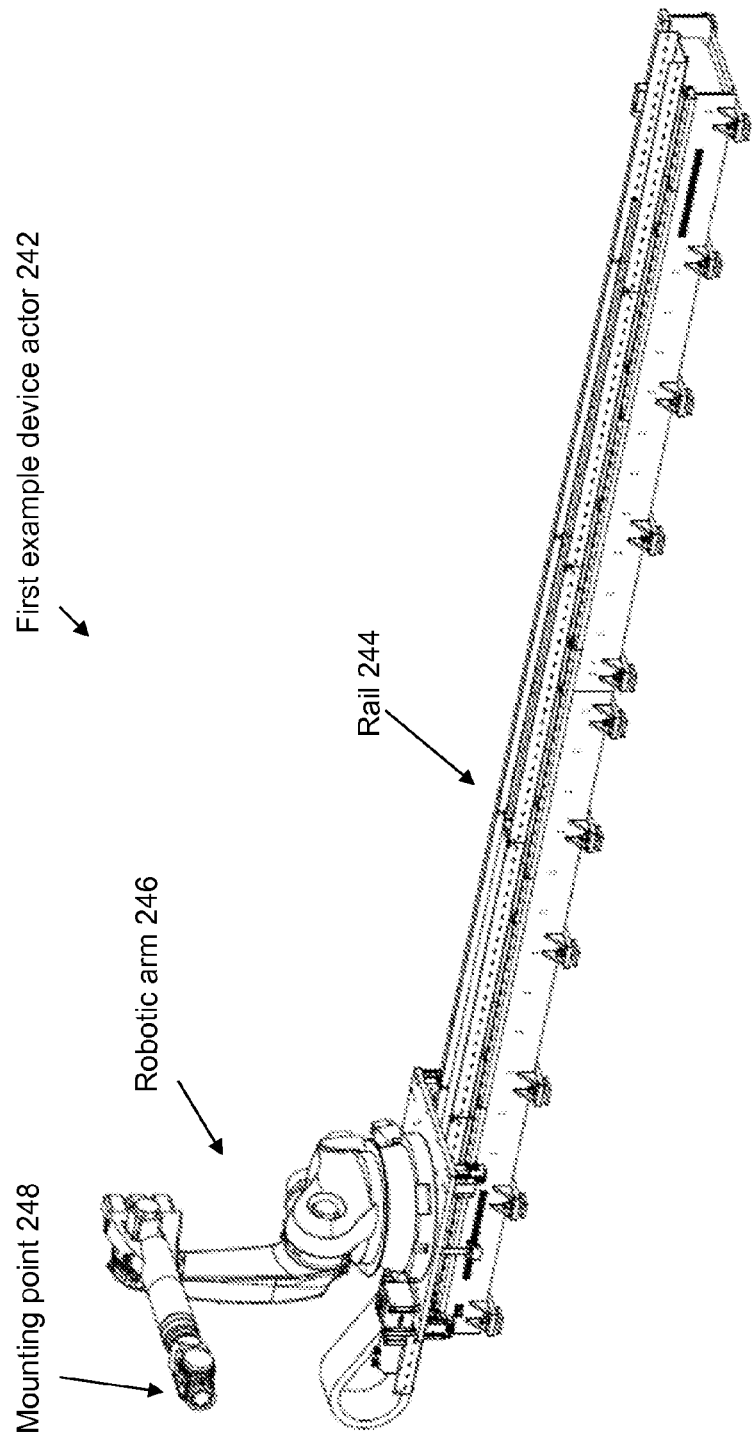
FIG. 2 shows a perspective view of a robot for use with a motion control photography system according to one embodiment of the innovations herein.

FIG. 2 describes a first example device actor 242. Device actor 242 comprises robotic arm 246, mounting point 248, and rail 244. Device actor 242 is described in FIG. 2 with no specific functionality attached at any mounting point such as mounting point 248. Mounting point 248 may be configured to hold a camera, a light, a player that will be filmed by a camera, or any other relevant device or object. In certain embodiments, instructions may be given to position mounting point 248 at a specific location, and the positions of the axis of robotic arm 246 and of rail 244 may be calculated by a process of the related motion control system. In alternative embodiments, each axis of robotic arm 246 and the position of rail 244 require separate, individual settings and control commands.

Figure 3A:
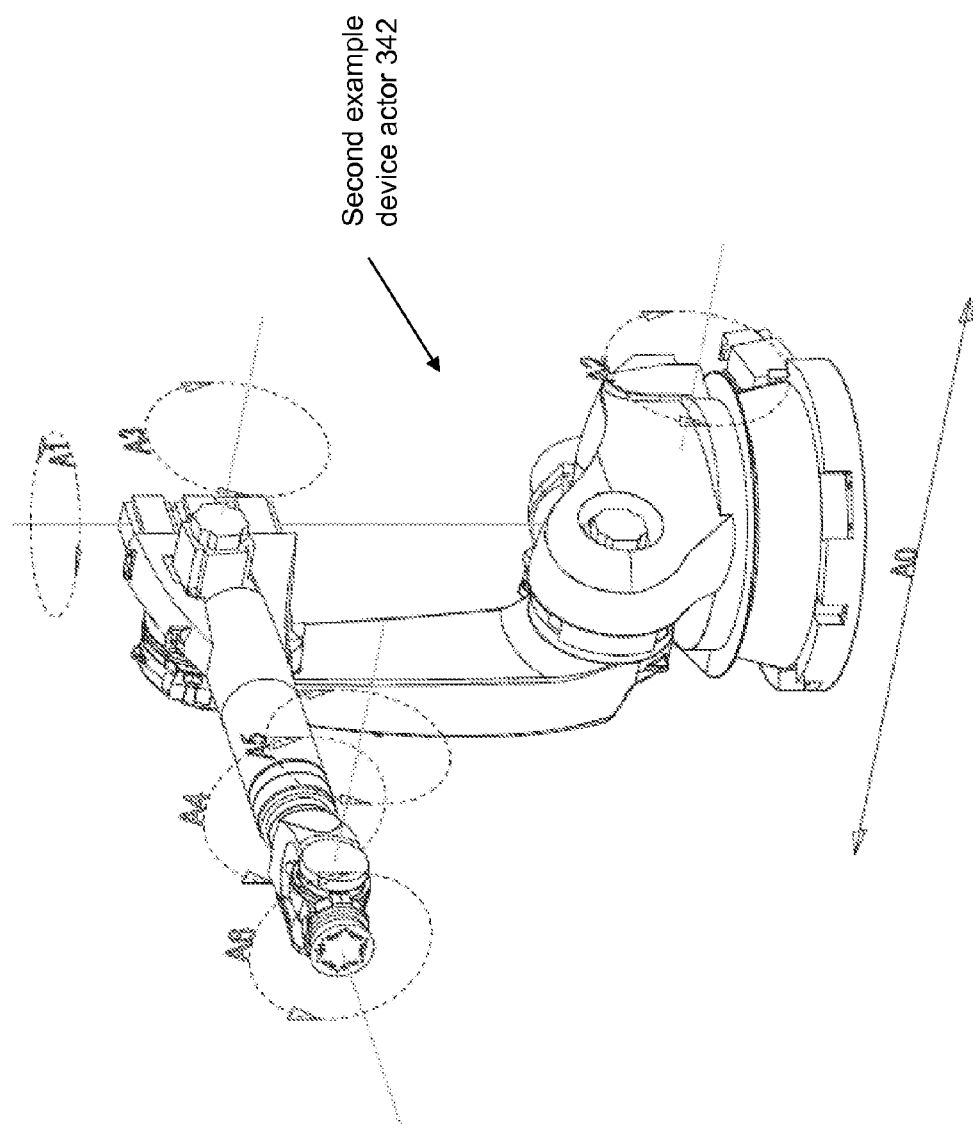
FIG. 3a shows a view of a robot with 7 degrees of freedom according to one embodiment of the innovations herein.
Figure 3B:
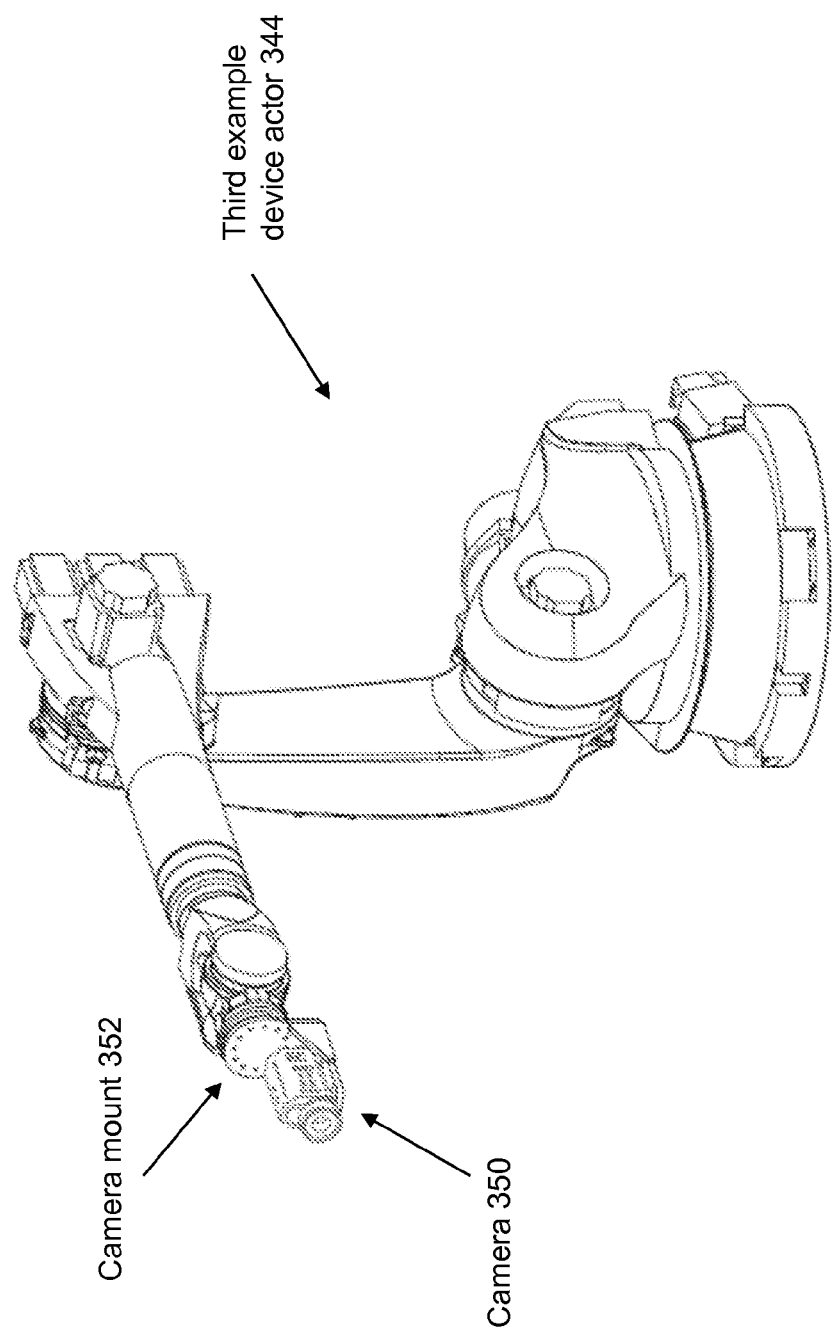
FIG. 3b shows a view of a robot with an attached camera according to one embodiment of the innovations herein.
Figure 3C:
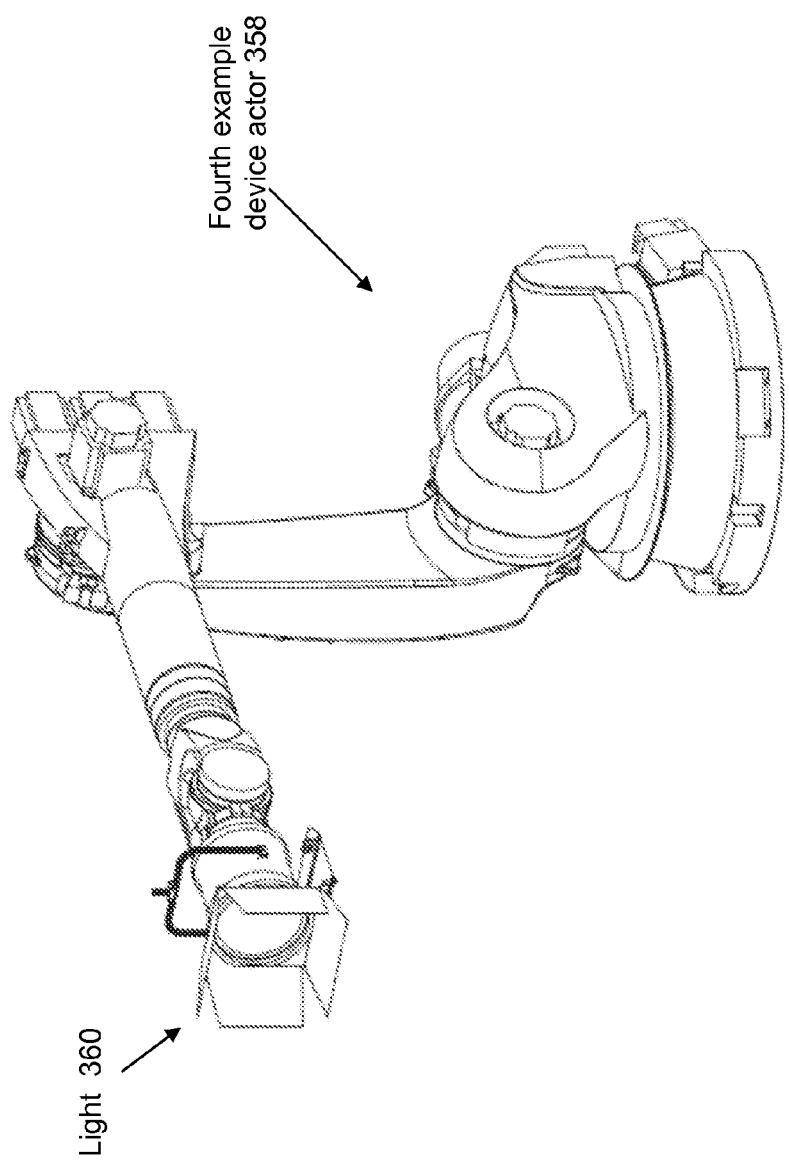
FIG. 3c shows a view of a robot with an attached lighting unit according to one embodiment of the innovations herein.

FIG. 3a describes a second example device actor 342, comprising a robotic arm with axis A1-A6, with axis A0 associated with a rail which is not shown that may allow side to side movement of the other eight axis. FIG. 3b describes a third example device actor 344 with a camera mount 352 placed at a mounting point, and camera 350 attached to camera mount 352. FIG. 3c describes a fourth example device actor 358 with light 360 placed at a mounting point.

Figure 4B:
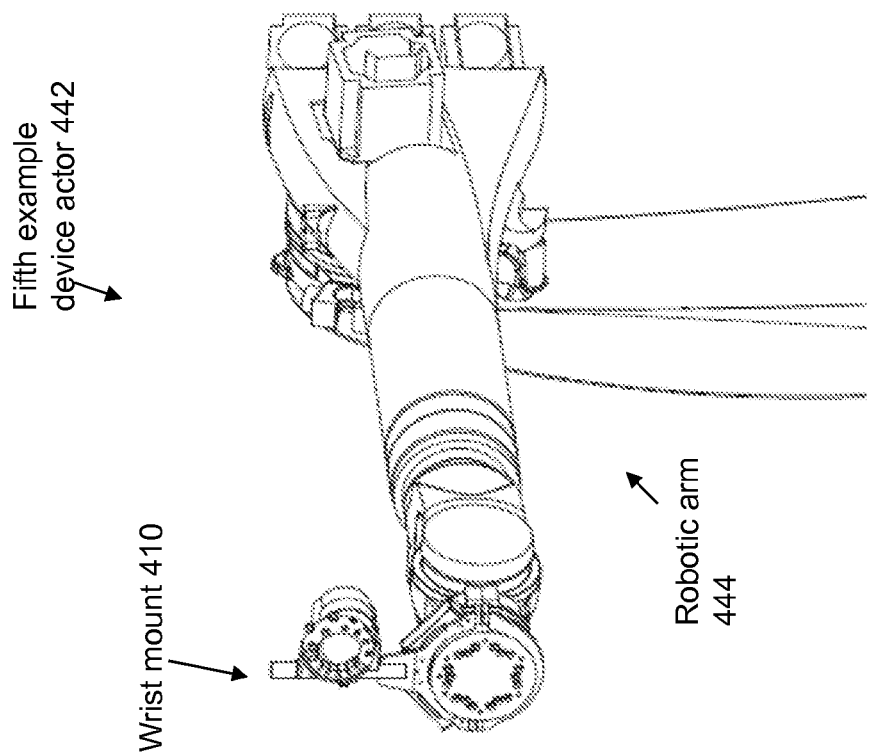
FIG. 4b shows a view of a robot with an attached wrist mount according to one embodiment of the innovations herein.
Figure 4A:
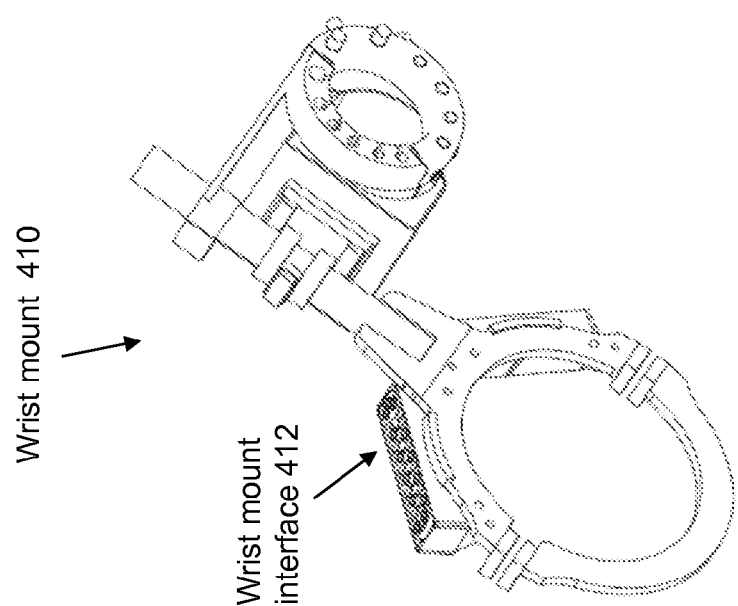
FIG. 4a shows a view of wrist mount for use with a robotic arm in accordance with one embodiment of the innovations herein.
Figure 5B:
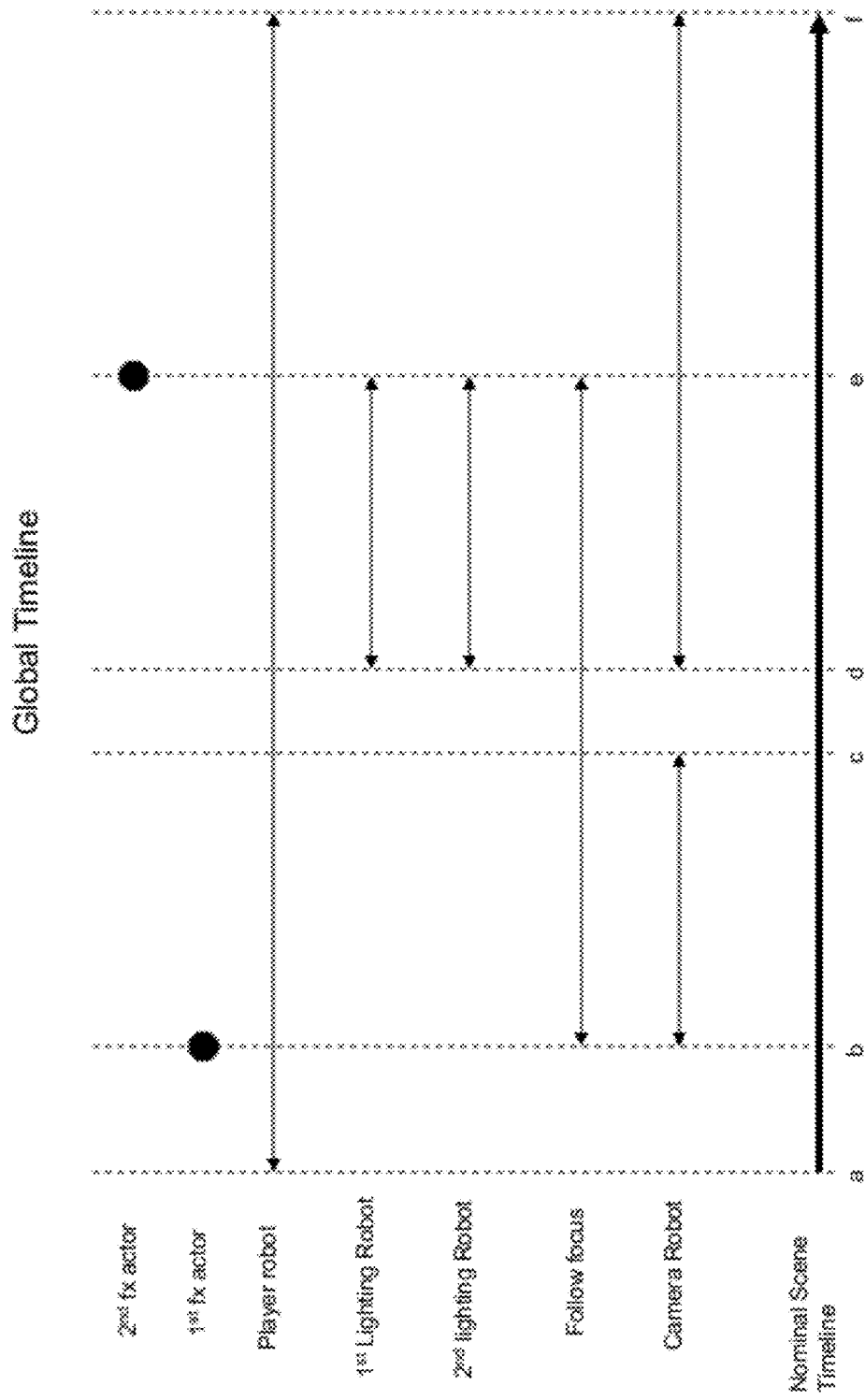
FIG. 5b illustrates a global timeline coordinating device actor positions through a master control according to one embodiment of the innovations herein.

FIGS. 4a and 4b describe an embodiment where a fifth example device actor 442 comprises a robotic arm 444 with a wrist mount 410 and a wrist mount interface 412. Wrist mount 410 and wrist mount interface 412 may enable multiple device actors to be mounted to robotic arm 444 in addition to standard mounts such as a camera or lighting fixture. In certain embodiments, the wrist mount interface may enable temperature sensors, laser range detectors, microphones, speakers, fans, or other mechanical activated or special effects devices.

FIG. 5a describes example master input 524 which is one potential implementation of a master input such as master input 24 of FIG. 1. Master input 524 comprises a display interface 510, and engage control 540, a mode select 530, and an analog interface 520. The function of master input 524 will be described in conjunction with the global timeline of FIG. 5b.

FIG. 5b illustrates a global timeline associated with one potential embodiment of a motion controlled scene implemented in a motion control system such as motion control system 100 of FIG. 1. FIG. 5b includes a number of actors, as defined above, which operate during a scene with a nominal or standard running time from time a to time f. The global timeline is nominal and not referring to real clock time because, as will be detailed further below, master input controls may alter the rate at which actors progress through motions from the beginning of a scene to the end of a scene. The global timeline may therefore alternately be thought of as a coordinated position chart for actors. During the scene running time, an actor may act or move during the entire scene, during a portion of the scene, or only for one instant of a scene. Each actor, though, will have a predetermined point for each nominal time from the beginning to the end of the scene. The predetermined points for each actor are associated with predetermined points for each other actor.

In one potential embodiment, individual control signals for specific device actors are coordinated into a single file within a memory of a master control with a common base time provided by a master clock within the master control. During operation, master control extracts control signals for each device actor and provides individual control signals to each device actor at the appropriate intervals. In an alternative embodiment, a master control maintains separate individual control signal files and timing data for different device actors, and synchronizes the different control signals separately from the individual control files.

In another alternative embodiment, the control data for a portion of the device actors is transferred by a master control to a memory within an associated individual device actor. During operation, device actors having control data within memory receive only a synchronization signal that may indicate a location in a global timeline, a rate of progress through a global timeline, or both.

The specific embodiment described in FIG. 5b includes a camera robot, a follow focus, two lighting robots, a player robot that controls an object that is to appear in front of a camera, and two special effects actors. As described above, each actor has a path to follow through the scene from beginning at time a to end at time f. In the specific embodiment of FIG. 5b, each actor begins at a preset position. As described by the global timeline, only the player robot moves from time a to time b. This will be true whether b occurs 10 seconds after starting time a, or 20 seconds after time a due to modification of the rate at which the scene progresses by a master input, as is further detailed below. At time b, $1^{st}$ special effects actor is activated with a single command, player robot continues moving, and follow focus and camera robot begin moving.

The chart of FIG. 5b is not meant to indicate that non-moving actors such as 1st lighting robot, 2nd lighting robot, and 2nd fx actor during time a to time b are not receiving input commands. FIG. 5b merely illustrates a global position timeline. In certain embodiments they may not be receiving input commands from a master control. In alternative embodiments, however, non-moving actors such as 1st lighting robot may periodically or continuously receive commands from a master control, even when not moving, where the command is an instruction not to move. Such a command may function to maintain synchronization, acting as a clock or a timing heartbeat to maintain synchronization. In some embodiments, real time adjustments may be made to an actor during a scene. Such a clock or timing heartbeat may further serve to provide synchronization data as the adjustments feed back to the master control to update and change the global timeline.

Referring back to FIG. 5a, master input 524 includes a display interface 510. Display interface 510 may be a modular touch screen device that may display status information related to actors or the global timeline. For example, display interface 510 may include a scene time associated with the current position of the actors in the global timeline, or a frame number for a current scene associated with the current timeline. In such a display, time a, for example, or frame 1, may be displayed when the actors are in position for the beginning of the scene. In one potential embodiment, display interface 510 may be a portable electronic device or a cellular telephone with an interface application that communicates with a master control.

Master input 524 may additionally comprise an engage control 540. Because of the size and force that many actors, particularly large industrial robot arms carrying heavy cameras moving at up to several meters per second, are capable of conveying in a collision, safety controls may be extremely important for many embodiments of a motion controlled scene. Engage control 540 acts as an input regulator to prevent master input 524 from being operated by accident, such that engage control must be depressed at all times prior to any other input command being conveyed and acted upon from master input 524.

As shown in FIG. 5a, master input 524 may also comprise a mode select 530 and an analog interface 520. Analog interface 520 may be any input device capable of defining a range of inputs by a user control. In one potential embodiment, analog interface 520 may be a wheel with a spring action that returns the wheel to a central position in the absence of user manipulation. In other potential embodiments, analog interface may be a lever, a sliding tab, or any other input control to enable a user to input a signal. Master input 524 may comprise multiple input modes. In one potential embodiment, master input 524 comprise a reset mode, a play mode, and a scan mode, with the mode selectable via mode select 530.

In a reset mode, operation of engage control 540 and analog interface 520 may operate to cause each actor within a scene to move to an initial position for the beginning of a global timeline. Additionally, a specific scene or frame number may be selected by use of display interface 510, and operation causes each actor to move to a position associated with that frame or time in the global timeline. Such a mode may allow device actors that are out of position for a particular time to be reset to a correct position.

In a play mode, operation of analog interface 520 may serve to speed up or slow down progress through a scene in a global timeline. For example, in a scene with actors set in position at global time a, selecting engage control 540 may serve to begin the action of all actors through the global timeline at a base rate, where each second of time is associated with one second of progress through the global timeline. Operation of analog interface 520 in a first direction may then serve to slow down progress through the global timeline, such that 1 second of real time may be associated with 0.5 seconds of progress through the global timeline. If the analog interface 520 is then set back to center, the progress through the global timeline will revert to a one to one ratio with real time, but with the remaining actions being delayed from the initial start by the previous slowdown. Conversely, if analog interface 520 is operated in a second direction opposite from the first direction, progress through the global timeline may be increased. If, for example, the nominal time from time a to time b is 10 seconds, increasing progress through the global timeline by 10% may reduce that actual time required for the motion controlled scene to progress from the positions of time a to the positions of time b by approximately 0.9 seconds and the actual time required the progress from time a to time b with analog interface set to increase playback being approximately 9.1 seconds. This may provide use when a human player being recorded by a camera as part of a motion controlled scene is delivering lines more slowly or more quickly than expected, and there is a desire to match the actions of the motion controlled scenes with the actions of human players that are not motion controlled.

In a scan mode, selecting the engage control 540 and then operating analog interface 520 may operate to shuttle or scan forwards or backwards through the global timeline in a continuous fashion. For example, if a motion controlled set currently has actors in positions associated with time c, selecting shuttle mode and operating analog interface 520 in a first direction may cause all actors to move continuously forward through the positions associated with the global timeline to reach time d. Moving analog interface 520 in a second direction may cause all actors to move continuously backwards through the positions associated with the global timeline to reach the positions associated with time b. In one potential embodiment, a particular time or frame may be selected using display interface 510. Operation of analog interface 520 may shuttle continuously through the positions of the global timeline until the particular time or frame is reached. Master input 524 may then cease to control device actors until a selection in display interface 510 is activated acknowledging that the previously selected point has been reached, or until analog interface 520 is returned to a central position.

Figure 6A:
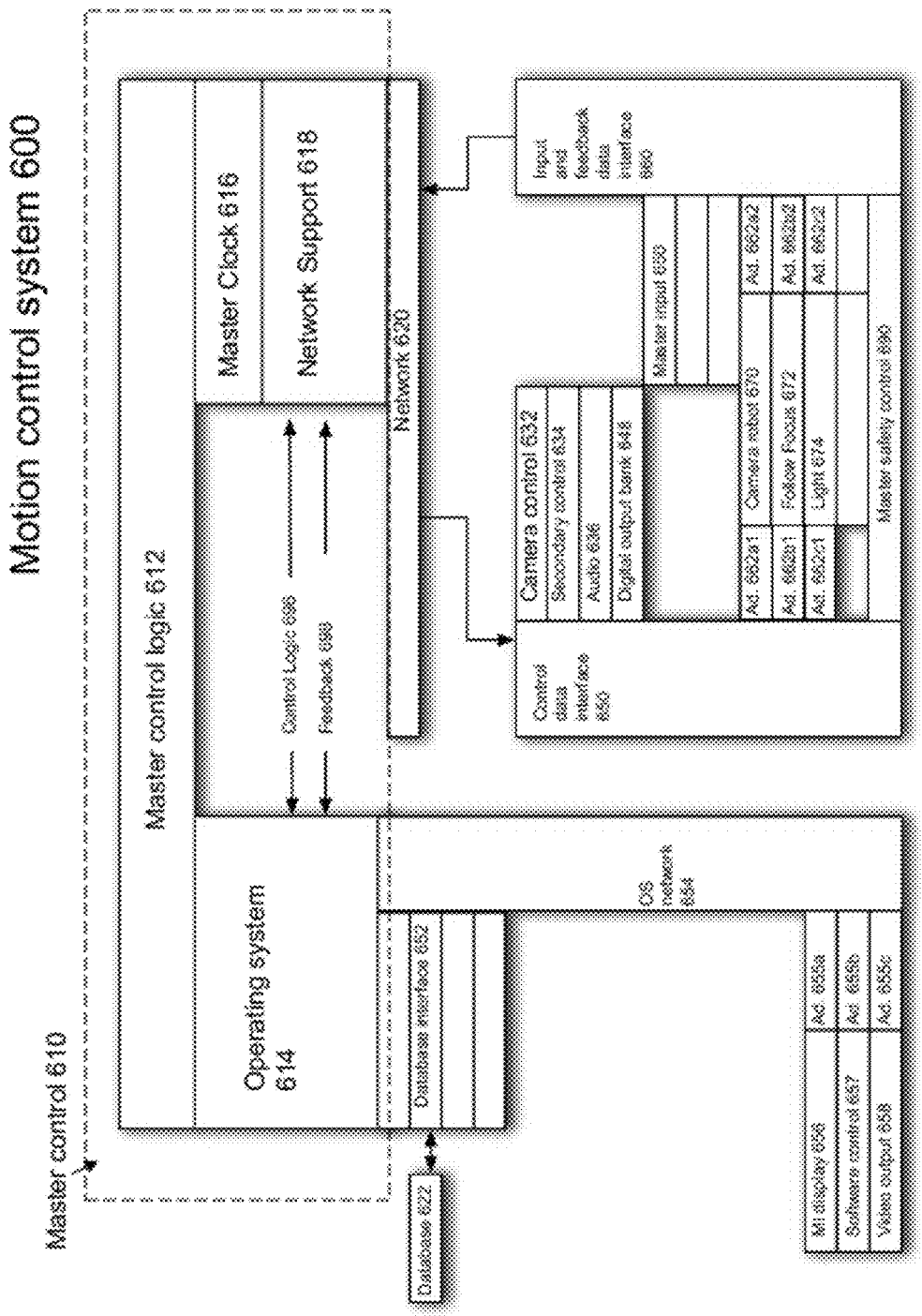
FIG. 6a shows a block diagram of a motion control photography system including a master scene control according to one embodiment of the innovations herein.

FIG. 6a describes a block diagram of a motion control system 600. Motion control system 600 comprises a master control 610, as well as details of one potential embodiment of input, feedback, and device actor sub-systems. In the embodiment disclosed by motion control system 600, master control 610 comprises an operating system 614, master control logic 612, master clock 616, network support 618, control logic 696, and feedback 698. The elements of master control 610 may be implemented in a computer system comprising a general function processor and memory hardware system. Alternatively, master control 610 may be implemented in custom designed processing, memory, and networking hardware devices, or may be implemented in an abstracted software layer of a general purpose computing system. Master clock 616 may function as a real time clock to coordinate movement of the actors in the system. Master control logic 612 may function to integrate the individual control signals into a master timeline, and to correctly route control signals to the correct device, both during operation of the entire motion control scene through the master timeline, and through individual modification and setting of device actor positioning and function using control logic 696. Master control logic 612 may also assist in coordination and routing of feedback 698.

Feedback 698 may include actual position and setting signals received from monitors attached to device actors. One potential example is a location device attached to a robot arm. The actual position of the arm may be tracked via the location device to provide feedback and calibration in relation to an input position command sent to the arm from either database 622, software control 657, or another control input for the robot arm. Operating system 614 may include special libraries and functionality for interacting with device actors, and may further serve to manage basic hardware computing functionality such as memory storage and processor usage. Operating system 614 may further enable networking capability via OS network 654 to communicate with various related devices.

Network support 618 may also enable communications from master control 610 to related devices, actors, and input controls via network 620. In one potential embodiment, network 620 may comprise an Ethernet for Control Automation Technology (EtherCAT) network operating according to IEEE 1588. In such an embodiment, packets are no longer received, then interpreted and copied as process data at every connection. Instead, the frame is processed on the fly using a field bus memory management unit in each slave node. Each network node reads the data addressed to it, while the telegram is forwarded to the next device. Similarly, input data is inserted while the telegram passes through. The telegrams are only delayed by a few nanoseconds. On the master side commercially available standard network interface cards or on board Ethernet controller can be as hardware interface. The common feature of these interfaces is data transfer to the master control via direct memory access with no CPU capacity is taken up for the network access. The EtherCAT protocol uses an officially assigned Ether Type inside the Ethernet Frame. The use of this Ether Type allows transport of control data directly within the Ethernet frame without redefining the standard Ethernet frame. The frame may consist of several sub-telegrams, each serving a particular memory area of the logical process images that can be up to 4 gigabytes in size. Addressing of the Ethernet terminals can be in any order because the data sequence is independent of the physical order. Broadcast, multicast and communication between slaves are possible. Transfer directly in the Ethernet frame is used in cases where EtherCAT components are operated in the same subnet as the master controller and where the control software has direct access to the Ethernet controller. Wiring flexibility in EtherCAT is further maximized through the choice of different cables. Flexible and inexpensive standard Ethernet patch cables transfer the signals optionally in Ethernet mode (100BASE-TX) or in E-Bus (LVDS) signal representation. Plastic optical fiber (POF) can be used in special applications for longer distances. The complete bandwidth of the Ethernet network—such as different fiber optics and copper cables—can be used in combination with switches or media converters.

Fast Ethernet (100BASE-FX) or E-Bus can be selected based on distance requirements. The Fast Ethernet physics enables a cable length of 100 m between devices while the E-Bus line is intended for modular devices. The size of the network is almost unlimited since up to 65535 devices can be connected.

Further, such an embodiment using EtherCAT supports an approach for synchronization with accurate alignment of distributed clocks, as described in the IEEE 1588 standard. In contrast to fully synchronous communication, where synchronization quality suffers immediately in the event of a communication fault, distributed aligned clocks have a high degree of tolerance from possible fault-related delays within the communication system.

Thus, data exchange may be completely hardware based on "mother" and "daughter" clocks. Each clock can simply and accurately determine the other clocks run-time offset because the communication utilizes a logical and full-duplex Ethernet physical ring structure. The distributed clocks are adjusted based on this value, which means that a very precise network-wide time base with a jitter of significantly less then 1 microsecond is available.

However, high-resolution distributed clocks are not only used for synchronization, but can also provide accurate information about the local timing of the data acquisition. For example, controls frequently calculate velocities from sequentially measured positions. Particularly with very short sampling times, even a small temporal jitter in the displacement measurement leads to large step changes in velocity. In an embodiment comprising EtherCAT, the EtherCAT expanded data types (timestamp data type, oversampling data type) are introduced. The local time is linked to the measured value with a resolution of up to 10 ns, which is made possible by the large bandwidth offered by Ethernet. The accuracy of a velocity calculation then no longer depends on the jitter of the communication system. It is orders of magnitude better than that of measuring techniques based on jitter-free communication.

Finally, in an embodiment where network 620 comprises EtherCAT, a hot connect function enables parts of the network to be linked and decoupled or reconfigured "on the fly". Many applications require a change in I/O configuration during operation. The protocol structure of the EtherCAT system takes account of these changing configurations.

As described in FIG. 6a, network 620 then interfaces with individual devices and actors via control data interface 650. Control data interface may be part of network 620, or may comprise distributed components at the input of individual actors. Additionally, Input and feedback data interface may be the same device as control data interface, acting as an opposite direction data flow of the same device interfacing with network 620. The actors interfacing with network 620 comprise camera control 632, secondary control 634, audio 636, digital output bank 648, camera robot 670, follow focus 672, light 674, master input 650, and master safety control 690.

In certain embodiments, some actors may communicate directly to network 620 via control data interface 650. For example, in the embodiment described above where network 620 is an EtherCAT network, camera control 632, secondary control 634, audio 636, and digital output bank 648 may be able to communicate with no adapter through network 620. In such an embodiment, adapter 662a may be an EtherCAT-provibus adapter for communicating with camera robot 670, adapter 662b may be an EtherCAT-preston adapter for communicating with follow focus 672, and adapter 662c may be an EtherCAT-dmx adapter for controlling light 674.

In addition to master control 610 and the devices communicating with master control 610 via network 620, motion control system 600 may comprise a plurality of other input, feedback, and devices such as OS network 654, database 622, database interface 652, master input (MI) display 656, software control 657, video output 658, and adapters 655a-c. In one potential embodiment, OS network 654 is an Ethernet network coupled to master control 610. MI display 656 may function as a display for master input 650 in a manner similar to the display described for master input 524 of FIG. 5a. Software control 657 may function as a software environment that may virtually create a global timeline for use with master control 610, and may also function to create a global timeline in real-time with live control of device actors. In one embodiment, software control 657 may be a software program such as MAYA™ with supporting software add-ons. Finally, video output 658 may be a real time video output associated with a camera in motion control system 600. As motion control system moves through a global timeline, video output may allow real time video review of a motion controlled set, such that individual device actors may be modified, or a master input 650 controls may be adjusted based on information from video output 658.

Figure 6B:
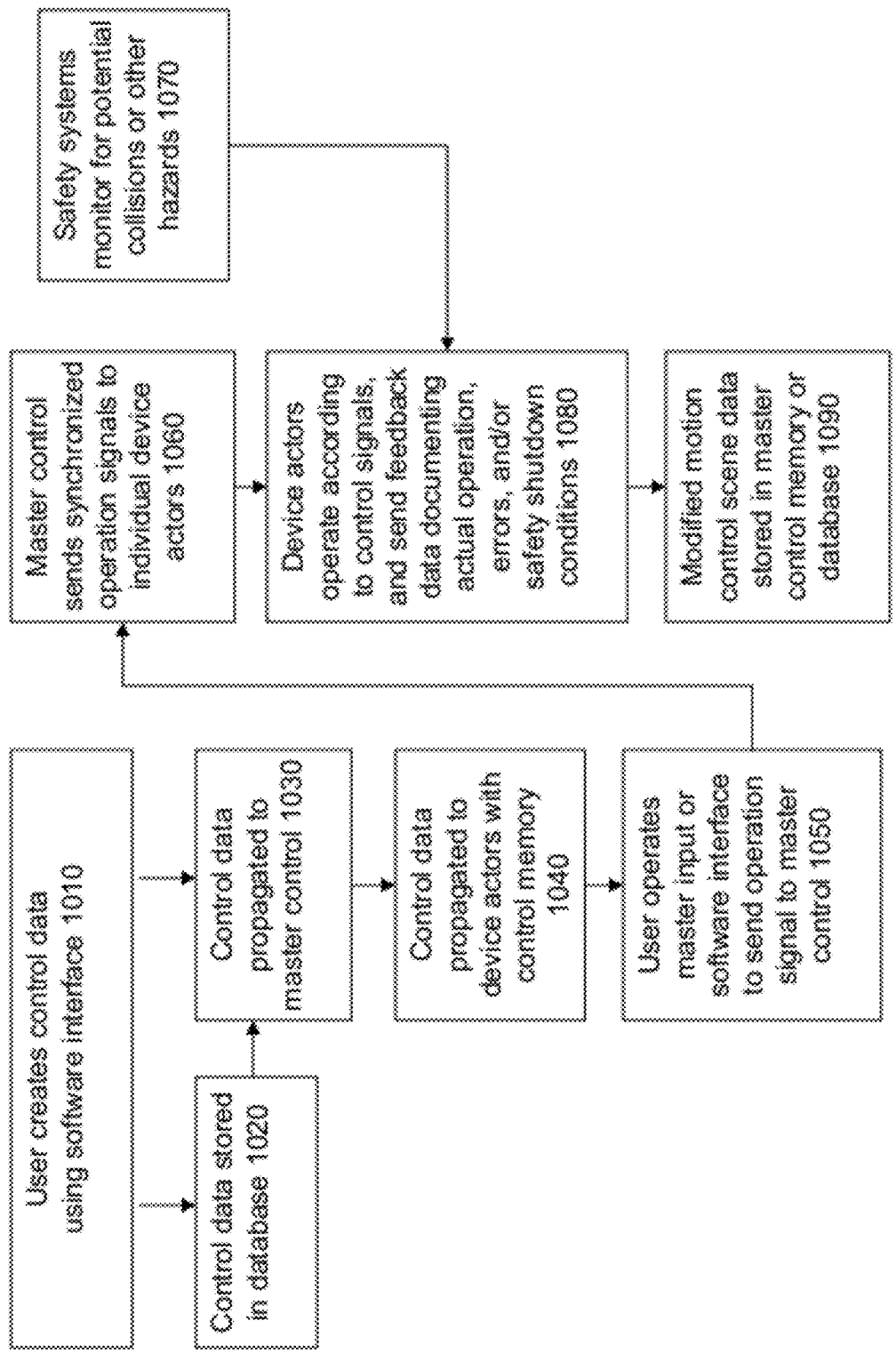
FIG. 6b illustrates a method of control according to one embodiment of the innovations presented herein.

Motion control system 600 of FIG. 6a may then allow for function and creation of media in a variety of different ways, and described by FIG. 6b. In an embodiment described by FIG. 6b, a user may create control data using a software interface such as software control 657, as shown by block 1010. The control data may then be stored in database 622 for future use, as shown by block 1020. Alternatively or concurrently, the control data may be sent to master control 610, as shown by block 1030. The master control then manages control logic 696 and creates a global timeline, such that any data required by specific devices prior to function is communicated to those devices, as shown by block 1040. For example, in one potential embodiment, camera robot 670 must have all position data prior to operation, with camera robot 670 functioning in synchronization with the global timeline by receiving a time or frame input and acting in response using previously received control information to move to the correct position for the current state of the global timeline. After the global timeline is prepared by master control 610, and all device actors are prepared, a user may use a master input 650 or a software control 657 to send an operation signal to master control 610, as shown by block 1050. The master control then sends the appropriate control signals to individual device actors given the global timeline position and synchronization, as shown by block 1060. Safety systems may monitor for potential collisions or other hazards, as shown by block 1070. The device actors then operate according to control signals, and send feedback signals via network 620 documenting actual operation, errors, and/or safety shutdown conditions, as shown by block 1080. The feedback data can then be used to update the control signal managed by master control 610 to modify or match the original control data from the database 622 or software control 657, as shown by block 1090.

In one potential embodiment, motion control system 600 comprises master safety control 690. Master safety control may comprise a hard wired shutdown control connected directly to device actors identified as posing a safety risk. Such a shutdown control may be attached to master input 650. In another potential embodiment, master safety control 690 comprises a safety computing system or a safety programmable logic controller (PLC) attached to safety sensors. Such safety sensors may comprise object proximity detectors attached to a device actor. When a scene is created in motion control system 600, the scene will have data for expected device actors and for players appearing in the scene. Object proximity detectors may be programmed or coupled to a computing system to filter expected objects with expected locations from unexpected objects and locations. If an object is detected by an object proximity detector in an unexpected and unsafe location, a signal is sent to shut down the entire motion controlled scene, or at a minimum, device actors determined to pose a potential danger to the unexpected object. In another potential embodiment, boundaries for a motion controlled scene are determined. Proximity detectors or motion detectors may be configured to detect movement across a scene boundary or a device actor boundary during operation of the motion control system, and to halt operation when an unsafe motion or object is detected. In this fashion, master safety control may observes an area proximate to various device actors and transmit a safety shutdown signal. In one potential embodiment, an object detector comprises a light detection and ranging unit (LIDAR). In another potential embodiment, the object detector is a passive infrared sensor (PIR).

Figure 7:
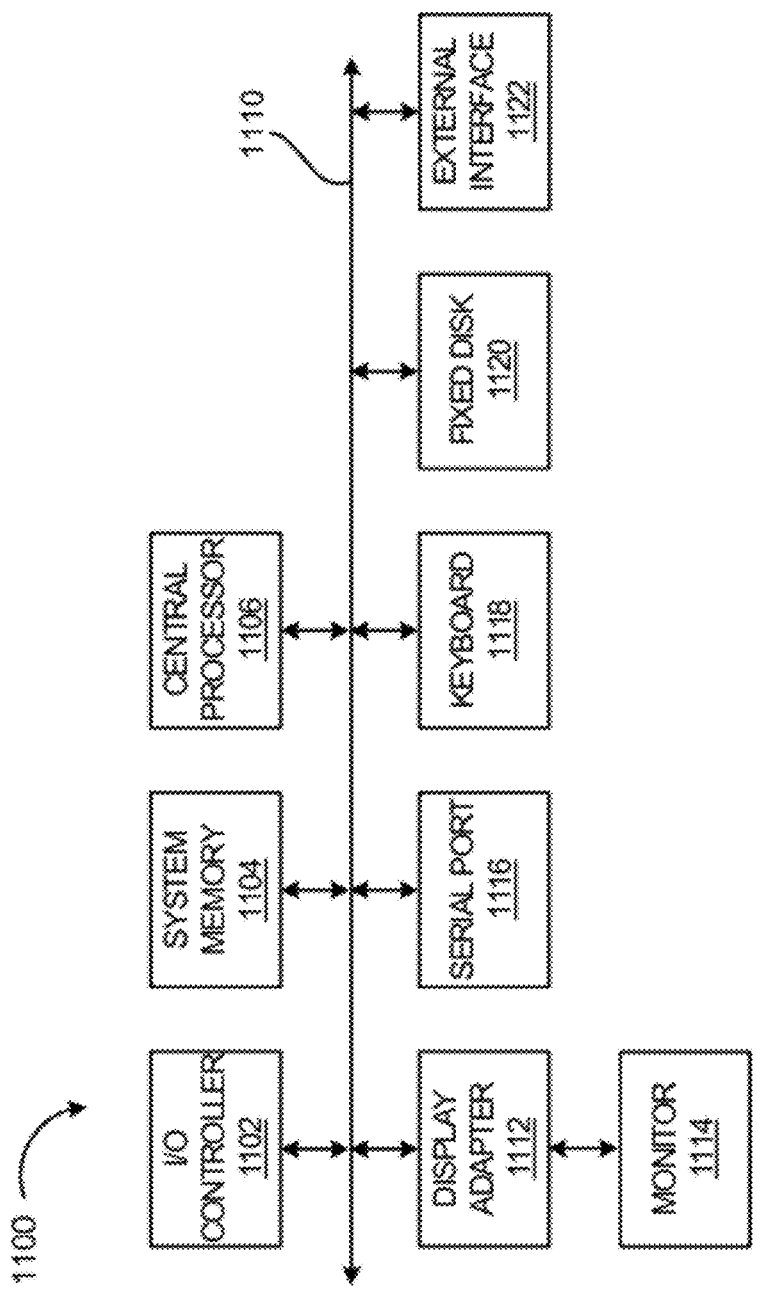
FIG. 7 shows one potential implementation of a computer or electronic device in accordance with various embodiments of the present innovations.

FIG. 7 shows a block diagram of an exemplary computer apparatus that can be used in some embodiments of the invention (e.g., in the components shown in the prior Figures).

The subsystems shown in FIG. 7 are interconnected via a system bus 710. Additional subsystems such as a keyboard 718, fixed disk 720 (or other memory comprising computer readable media), monitor 714, which is coupled to display adapter 712, and others are shown. Peripherals and input/output (I/O) devices, which couple to I/O controller 702, can be connected to the computer system by any number of means known in the art, such as through serial port 716. For example, serial port 716 or external interface 722 can be used to connect the computer apparatus to a wide area network such as the Internet, a mouse input device, or a scanner. The interconnection via system bus 710 allows the central processor 706 to communicate with each subsystem and to control the execution of instructions from system memory 704 or the fixed disk 720, as well as the exchange of information between subsystems. The system memory 704 and/or the fixed disk 720 may embody a computer readable medium.

Figure 8:
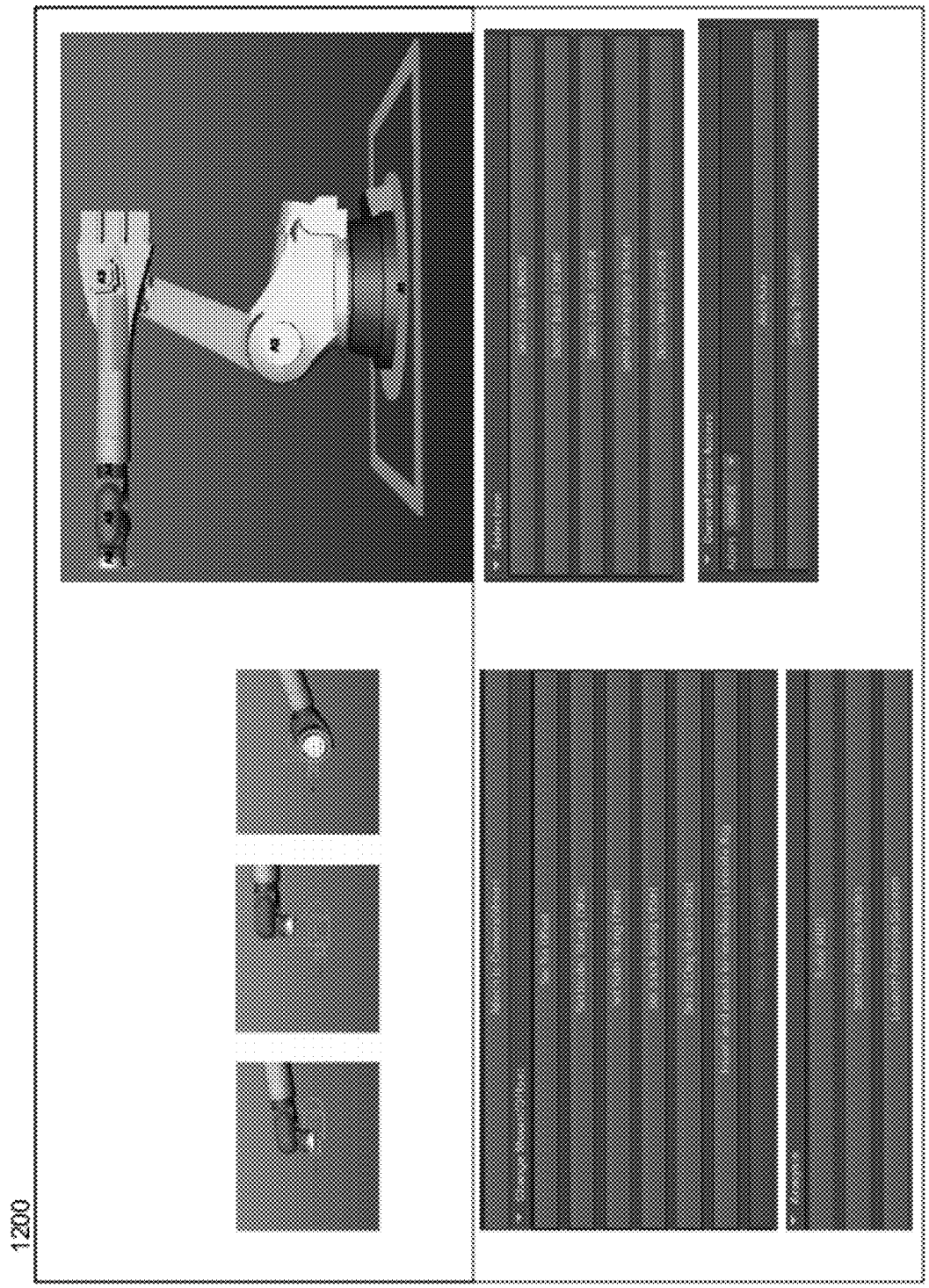
FIG. 8 illustrates a potential user interface for a software control according to one embodiment of the innovations herein.

FIG. 8 illustrates one potential embodiment of a user interface 1200 in a software control for use with a motion control photography system. Such an interface may enable a number of functions, including modeling of individual device actors, software control of individual device actors, creation of control data for individual device actors, and recording control or operation data for individual device actors. Similarly multiple devices may be modeled simultaneously to model, control, or record operation of an entire motion controlled set using an interface such as user interface 1200.

User interface 1200 may include an actor panel with a plurality of interface buttons including an "actors" drop down menu to show a list of the current device actors is a scene, and "add actor" scene to bring up a prompt which allows selections of a name and/or type of device actor to be created or added to a scene, and a "delete actor" interface to allow deletion of an actor from a scene.

User interface 1200 may also include a selection panel. A selection panel may include an interface for "Select End Effector" which selects a controller on the robot which allows the user to drive the robot via a wrist. This controller, when selected and viewed through channel box editor, may house additional attributes that the user can control. These attributes may include:

Visibility—Toggles the visibility of the controller in a view port.
Disable Heads up Display (HUD) Updates—Disables all HUD updates in a view port.
A(1-6) Angle—Displays the current angle of each respective robot axis.
Track Robot (TR) Position—Displays the position of robot on the track axis.
Show Axes—Toggles the visibility of a skeleton in a view port.
FK IK (A1-A6)—Allows the switching settings for of individual joints.

A selection panel may also include a "select base control" interface which may select a controller on the robot which allows the user to position the robot from the base. Such a controller may, when selected and viewed through the channel box editor, houses additional attributes that the user can manipulate such as:

Translate Z—Moves the base along the track system.
Rotate Y—Changes the orientation of the base.
Column Height—Changes the base height of the robot.

A selection panel may also include additional interface controls such as:

Select Track Control—Selects a controller on the robot which allows the user to move and orient the track system to their liking further describe the disconnect between the end effector and this node.
Select Worldspace Mount—Selects a controller for adding a mount.
Select World Controls—Selects a master controller which allows the user to move and orient the entire robot and track system together.

Additionally, user interface 1200 may provide controls for adding and removing mounts to device actors within the software system, and for setting placement for mounts that are added to device actors. For example, FIG. 8 shows three potential positions for mounting a camera to a robot arm that is a device actor in the current system. The user interface 1200 may provide graphical or number input selections for choosing between various mounting options, and for adjusting the position variables associated with such a setting.

In one potential embodiment of a motion control photography system, user interface 1200 may be integrated through a software control to a camera robot such as software control 657 and camera robot 670 of FIG. 6a to enable an automated system calibration. One potential such calibration comprises a lens node calculation for determining a calibrated lens position in a camera mounted to a robot arm. One potential embodiment of such a calibration comprises providing software control 657 with information regarding the location and dimensions of a base, wrist or joint elements, and camera mounts for camera robot 670. A calibration player with known characteristics such as location and size is also provided. When a calibrate command is selected via software control 657, camera robot 670 records a plurality of images of the calibration player from different camera angles or locations. The images in conjunction with known data regarding the calibration player and camera robot 670 allows the lense node of the currently mounted camera to be calculated and incorporated into the device actor modeled in software control 657.

In an alternative embodiment of a calibration, software interface 1200 may have a calibration command for altering size or location data in response to feedback from a temperature sensor. For example, software control 657 may be receive data via digital output bank 658 from a temperature sensor attached to a rail that is part of camera robot 670. Software control 657 may be configured to adjust command signals due to known changes in rail characteristics over temperature, or may be configured to signal a need to measure changes in device actor locations in response to temperature changes.

Figure 9:
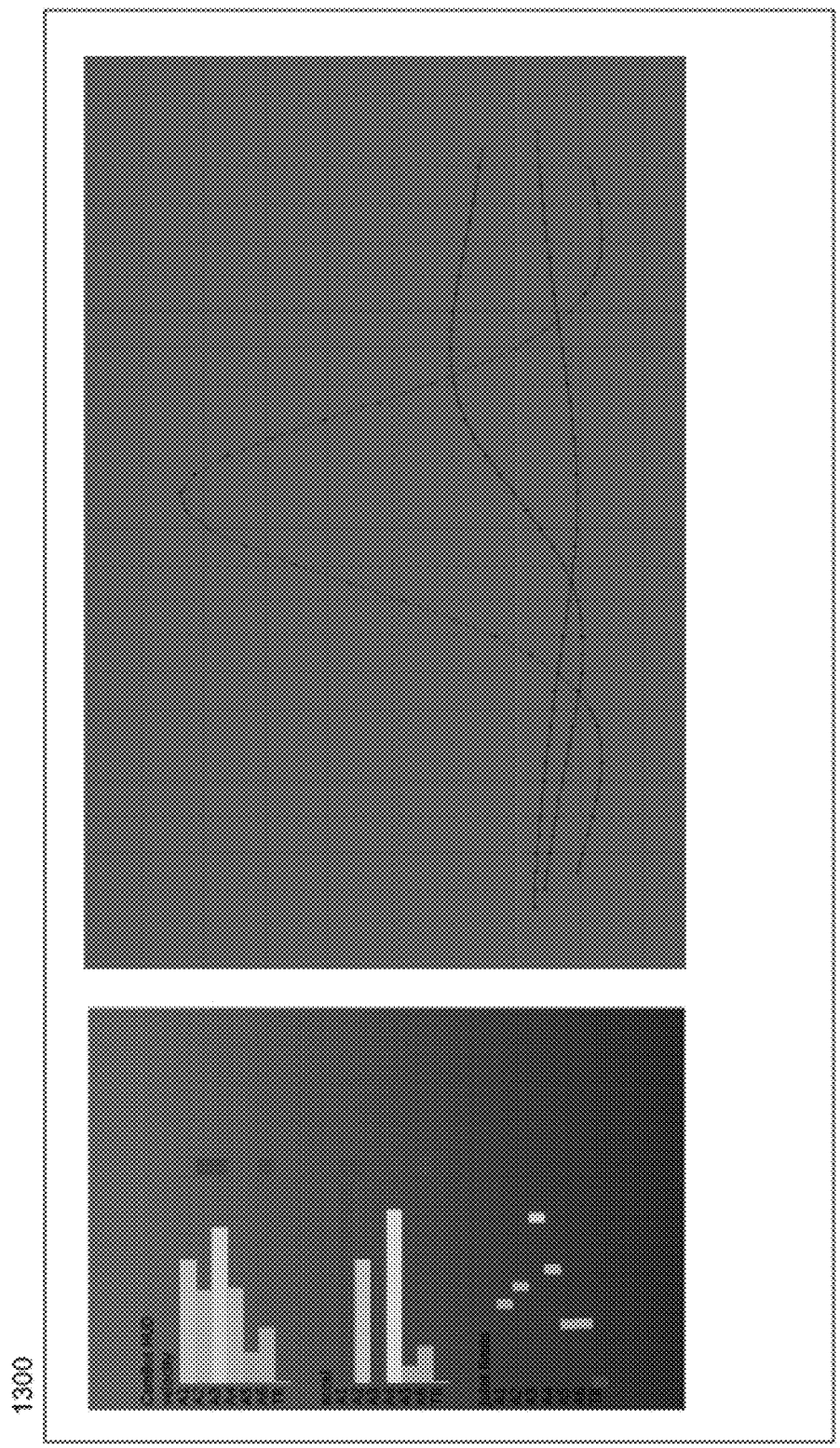
FIG. 9 illustrates a potential user interface for a software control according to one embodiment of the innovations herein.

A software control such as software control 26 of FIG. 1 or software control 657 of FIG. 6a may also comprise an analysis interface such as analysis interface 1300 of FIG. 9. Analysis interface 1300 shows movement data for individual axis of a device actor. Data such as current velocity and current acceleration may be displayed, along with graphs of these characteristics over time through a scene, maximum allowable limits for each characteristic, and maximum achieved value for each characteristic. The values presented in analysis interface 1300 may be modeled from a global timeline created within a software control or recorded in a database. The values may also be values recorded from the actual physical motion of device actors playing through a scene. Use of such analysis data may provide for modifications to be made to a scene while quickly verifying that safe limits of device actor function are not mistakenly exceeded.

In addition to analysis of operation of individual device actors, software control may be used for preventative safety in detecting potential collisions between device actors in modeling the motion of the actors through a global timeline. Further, such modeling of a scene through a global timeline may be used to set safety parameters for a safety system such as master safety control 690 of FIG. 6a. Modeling of locations and velocities of device actors through a global timeline may enable identification of unsafe zones and unsafe times in an area or set around a motion control system. Such an identification may be used to set sensing triggers of object detectors that are part of the safety system described above. For example, if an area within 5 feet of a certain device actor is determined to be at risk of collision, and a buffer zone of 10 additional feet is required to insure safety during operation, a LIDAR detector may be configured to detect unexpected objects and movement within a 15 foot area of the device actor during operation, and to automatically create a safety shutdown if an object is detected. In an alternative embodiment, the LIDAR detector may be configured to create a warning signal if an object is detected in a periphery of the danger zone, and only to create a shutdown if the detected object is moving toward a potential impact zone.

In an alternate embodiment, a software control includes modeling of actors and models of defined safe zones. Analysis of the motion of the actors in software control allows a modeled safety check to see if any actor collides with a defined safe zone. Safe zones may be defined by entry of fixed volumes of space into software control, by image capture of a set location. Safe zones may also be defined to be variable based on a detected motion, jerk, velocity, or acceleration of an object in a safe zone. In an alternate embodiment a safe zone may be defined by input from transponder device data. For example, a transponder location device may be attached to a player, and a safe zone defined by a distance from the transponder. The transponder feeds location data to software control, which may update safe zones within a software control or within a master safety control. In another embodiment, fixed safe zones are defined within software control, and published prior to a safety PLC within master safety control prior to operation of the motion controlled set.

Figure 10:
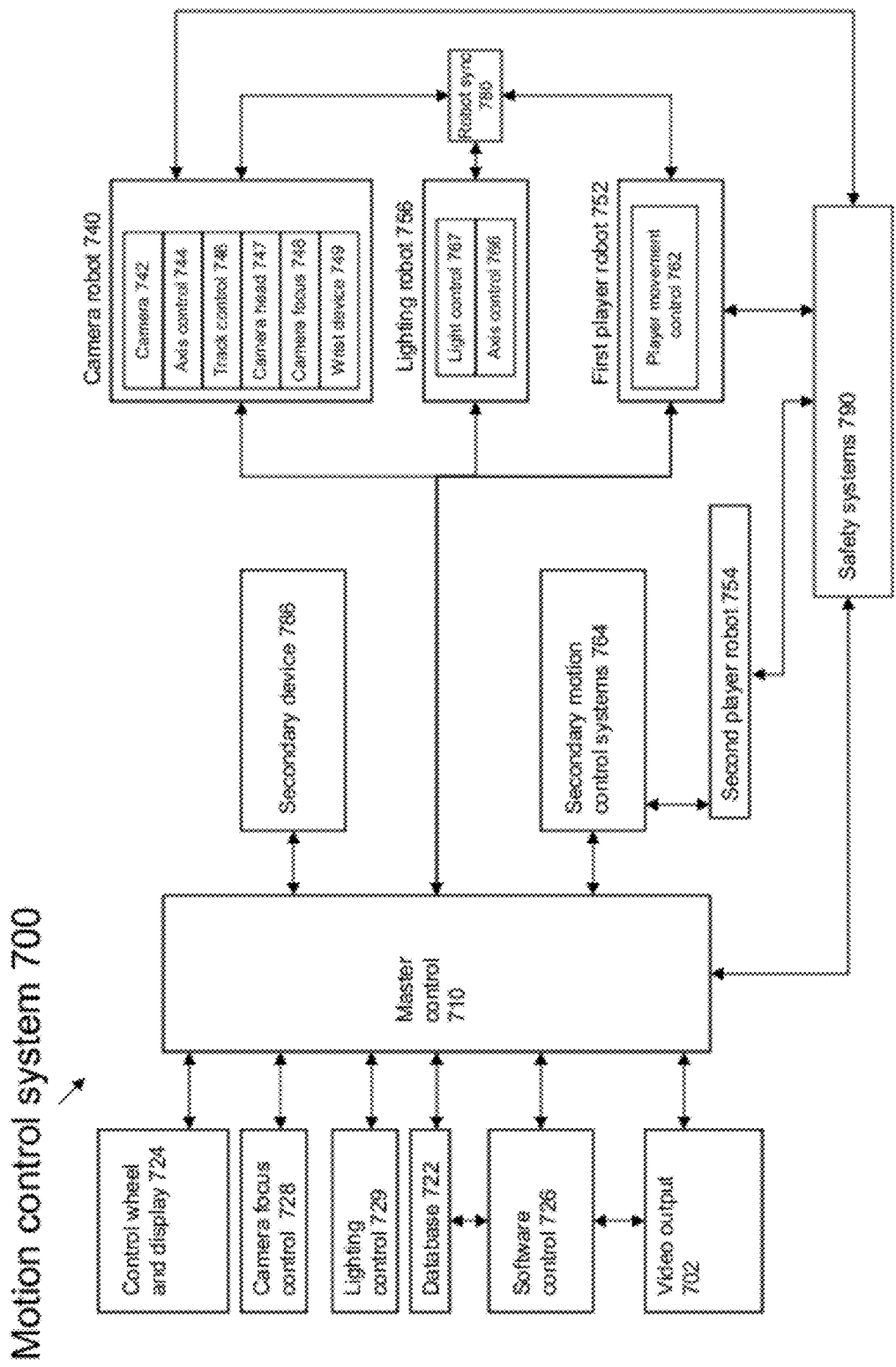
FIG. 10 shows a block diagram of a motion control photography system including a master scene control according to one embodiment of the innovations herein.

FIG. 10 describes an alternate embodiment of a motion control system according to the present innovations. Motion control system 700 includes video output 702, master control 710, database 722, control wheel and display 724, software control 726, camera focus control 728, and lighting control 729. Motion control system 700 further includes camera robot 740 including camera 742, axis control 744, track control 746, camera head 747, camera focus 748, and wrist device 749. Motion control system 700 further includes first player robot 752 including player movement control 762. Motion control system 700 further includes lighting robot 756 including axis control 766 and light control 767. Motion control system 700 further includes second player robot 754, secondary motion control systems 764, secondary device 786, robot synch 780, and safety systems 790. The function of and operation of motion control system 700 may be understood in conjunction with the detailed description of motion control systems described above.

The previous description of the embodiments is provided to enable any person skilled in the art to practice the invention.

The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

Embodiments of the invention are not limited to the above-described embodiments. For example, throughout the description, various examples of device actors and robots are presented for use in a motion control photography system. The embodiments are not limited to the general or specific examples provided herein, but may include other embodiments apparent to a person of ordinary skill in the art from the above descriptions. By further example, the above description provides an illustration of three modes selectable as input modes for a master input. The embodiments of the invention are not limited to these modes, but additional modes may be used that may differ from the modes presented.

It should be understood that the present invention as described above can be implemented in the form of control logic using computer software or computer hardware in a modular or integrated manner. Based on the disclosure and teachings provided herein, a person of ordinary skill in the art can know and appreciate other ways and/or methods to implement the present invention using hardware and a combination of hardware and software.

Any of the software components or functions described in this application, may be implemented as software code to be executed by a processor using any suitable computer language such as, for example, Java, C, or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CDROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not solely with reference to the above description, but instead should be determined with reference to the pending claims along with their full scope or equivalents.

Use of the phrase 'the invention', 'the present invention', 'the innovations', or 'the present innovations' is not meant to limit the claims in any manner and no conclusion should be drawn that any description or argument associated with a particular use of the phrase 'the invention', 'the present invention', 'the innovations', or 'the present innovations' applies to each and every claim. The use of the phrase 'the invention', 'the present invention', 'the innovations', or 'the present innovations' has been used solely for linguistic or grammatical convenience and not to effect a limitation of any nature on any of the claims.

One or more features from any embodiment may be combined with one or more features of any other embodiment without departing from the scope of the invention. For the purposes of the present application, a recitation of "a", "an" or "the" is intended to mean "one or more" unless specifically indicated to the contrary.

Certain embodiments employ range based metrics to quantify the improvement, particularly for sub-millimeter positioning of set components. The uses of individual numerical values are stated as approximations as though the values were preceded by the word "about" or "approximately." Similarly, the numerical values in the various ranges specified in this application, unless expressly indicated otherwise, are stated as approximations as though the minimum and maximum values within the stated ranges were both preceded by the word "about" or "approximately." In this manner, variations above and below the stated ranges can be used to achieve substantially the same results as values within the ranges. As used herein, the terms "about" and "approximately" when referring to a numerical value shall have their plain and ordinary meanings to a person of ordinary skill in the art to which the particular subject matter is most closely related or the art relevant to the range or element at issue. The amount of broadening from the strict numerical boundary depends upon many factors. For example, some of the factors which may be considered include the criticality of the element and/or the effect a given amount of variation will have on the performance of the claimed subject matter, as well as other considerations known to those of skill in the art. As used herein, the use of differing amounts of significant digits for different numerical values is not meant to limit how the use of the words "about" or "approximately" will serve to broaden a particular numerical value. Thus, as a general matter, "about" or "approximately" broaden the numerical value. Also, the disclosure of ranges is intended as a continuous range including every value between the minimum and maximum values plus the broadening of the range afforded by the use of the term "about" or "approximately." Thus, recitation of ranges of values herein are merely intended to serve as a shorthand method of referring individually to each separate value falling within the range, unless otherwise indicated herein, and each separate value is incorporated into the specification as if it there individually recited herein.

It is to be understood that any ranges, ratios and ranges of ratios that can be formed by, or derived from, any of the data disclosed herein represent further implementations of the present disclosure and are included as part of the disclosure as though they were explicitly set forth. This includes ranges that can be formed that do or do not include a finite upper and/or lower boundary. Accordingly, a person of ordinary skill in the art most closely related to a particular range, ratio or range of ratios will appreciate that such values are unambiguously derivable from the data presented herein.

What is claimed is:

1. A system for motion control photography comprising:
 a master control comprising a processor and a memory that is configured to receive a plurality of control signals for a plurality of mechanically operable device actors and synchronize the plurality of control signals with a global timeline to create a plurality of synchronized signals to cause each device actor of the plurality of device actors to operate during a scene at respective positions associated with corresponding times in the global timeline; and
 a master input device that is configured to convey a master input signal to the master control indicating an initial time in the global timeline and a rate to progress the scene through the global timeline;
 wherein the master control is configured to respond to the master input signal by communicating the plurality of synchronized signals to the plurality of device actors to cause each device actor of the plurality of device actors to undergo respective movements starting from respective initial positions associated with the initial time;
 wherein the respective movements for each device actor of the plurality of device actors correspond to the rate to progress the scene through the global timeline and the respective positions for each device actor associated with corresponding times in the global timeline.

2. The system of claim 1 wherein the master input device comprises an analog interface;
wherein the analog interface is configured to return to a first position when no force is applied to the analog interface;
wherein adjustment of the analog interface in a first direction increases the rate to progress the scene through the global timeline from a base rate; and
wherein adjustment of the analog interface in a second direction opposite from the first direction decreases the rate to progress the scene through the global timeline from the base rate.

3. The system of claim 2 wherein the analog interface comprises a wheel with a spring action that returns the wheel to the first position when no force is applied to the wheel.

4. The system of claim 1 further comprising an object detector that observes an area proximate to a first device actor of the plurality of device actors and transmits a safety shutdown signal to the first device actor when the object detector senses an object.

5. The system of claim 4 further comprising a master safety control;
wherein the master safety control comprises a programmable logic circuit; and
wherein the safety shutdown signal is transmitted to each of the plurality of device actors via the programmable logic circuit.

6. The system of claim 4 wherein the first device actor is a robotic arm, the object detector is attached to a mounting point of the robotic arm, and wherein the area proximate to the first device actor comprises an area extending a fixed distance from the object detector.

7. The system of claim 5 wherein the area proximate to the first device actor varies over time in a predetermined manner determined in association with the initial time in the global timeline and the rate to progress the scene through the global timeline.

8. The system of claim 7 wherein the object detector comprises a light detection and ranging unit.

9. The system of claim 1 wherein the plurality of device actors comprises at least one camera robot and at least one lighting robot.

10. A method of creating a film using motion control comprising:
receiving a plurality of control signals for a plurality of mechanically operable device actors at a master control comprising a processor and a memory;
synchronizing the plurality of control signals, using the master control, with a global timeline to create a plurality of synchronized signals to cause each device actor of the plurality of device actors to operate during a scene at respective positions associated with corresponding times in the global timeline;
receiving, at the master control, a master input signal indicating an initial time in the global timeline and a rate to progress the scene through the global timeline; and
communicating, in response to the master input signal, the plurality of synchronized signals from the master control to the plurality of device actors to cause each device actor of the plurality of device actors to undergo respective movements starting from respective initial positions associated with the initial time, wherein the respective movements for each device actor of the plurality of device actors correspond to the rate to progress the scene through the global timeline indicated by the master input signal and the respective positions for each device actor associated with corresponding times in the global timeline.

11. The method of claim 10, further comprising detecting, using at least one object detector, an object in an area proximate to a first device actor of the plurality of device actors; and
transmitting, from the at least one object detector, a safety shutdown signal that prevents the plurality of device actors from operating.

12. The method of claim 10, further comprising communicating the plurality of synchronized signals from the master control to the plurality of device actors to cause each device actor of the plurality of device actors to undergo movements continuously backwards from the respective initial positions through respective positions associated with prior corresponding times in the global timeline.

13. The method of claim 10 further comprising:
receiving at the master control, during the communicating of the plurality of synchronized signals, a modifying control input for a first device actor of the plurality of device actors from an independent manual control;
synchronizing the modifying control input with the plurality of synchronized signals to create an updated plurality of synchronized signals during the communication of the plurality of synchronized signals; and
communicating the updated plurality of synchronized signals in place of the synchronized signals.

14. The method of claim 13 further comprising storing the updated plurality of synchronized signals in a database, wherein the plurality of control signals are received at the master control from the database.

15. The method of claim 10 further comprising:
receiving at the master control, feedback data from the plurality of device actors describing actual operation according to the synchronized control signals; and
modifying the synchronized control signals in response to the feedback data.

16. The system of claim 1, wherein the master control is further configured to respond to the master input signal by causing each device actor of the plurality of device actors to move to the respective initial positions before causing each device actor to undergo respective motions starting from the respective initial positions associated with the initial time.

17. The system of claim 16, wherein the respective initial positions comprise respective positions associated with a particular frame of the global timeline.

18. The system of claim 1 wherein the master input comprises an analog interface;
wherein the analog interface is configured to return to a first position when no force is applied to the analog interface;
wherein adjustment of the analog interface in a first direction causes each device actor of the plurality of device actors to move continuously forward through respective positions associated with subsequent corresponding times in the global timeline; and
wherein adjustment of the analog interface in a second direction opposite from the first direction causes each device actor of the plurality of device actors to move continuously backwards through respective positions associated with prior corresponding times in the global timeline.

19. The system of claim 1, wherein the master input signal indicates at least one adjustment to the rate to progress the scene through the global timeline at a particular time in the global timeline;

wherein the master control is further configured to respond to the master input signal by causing each device actor of the plurality of device actors to undergo adjusted respective movements starting from respective positions associated with the particular time;

wherein the adjusted respective movements for each device actor of the plurality of device actors correspond to the adjusted rate to progress the scene through the global timeline and respective positions for each device actor associated with corresponding times occurring after the particular time in the global timeline.

20. A non-transitory computer readable medium having stored therein instructions, that when executed by a computing device, cause the computing device to perform functions comprising:

receiving a plurality of control signals for a plurality of robotic device actors;

synchronizing the plurality of control signals with a global timeline to create a plurality of synchronized signals to cause each device actor of the plurality of device actors to operate during a scene at respective positions associated with corresponding times in the global timeline;

receiving a master input signal indicating an initial time in the global timeline and a rate to progress the scene through the global timeline; and communicating, in response to the master input signal, the plurality of synchronized signals to the plurality of device actors to cause each device actor of the plurality of device actors to undergo respective movements starting from respective initial positions associated with the initial time, wherein the respective movements for each device actor of the plurality of device actors correspond to the rate to progress the scene through the global timeline indicated by the master input signal and the respective positions for each device actor associated with corresponding times in the global timeline.

* * * * *